(12) United States Patent
Rekin et al.

(10) Patent No.: US 12,110,746 B2
(45) Date of Patent: Oct. 8, 2024

(54) THREADED JOINT FOR PRODUCTION TUBING

(71) Applicant: Publichnoe aktsionernoe obshchestvo "Trubnaya metallurgicheskaya kompaniya", Moscow (RU)

(72) Inventors: Sergey Alexandrovich Rekin, Moscow (RU); Alexey Sergeevich Myslevtsev, Taganrog (RU); Pavel Nikolaevich Sidorenko, Taganrog (RU); Pavel Konstantinovich Ponomarenko, Taganrog (RU)

(73) Assignee: Publichnoe Aktsionernoe Obshchestvo Trubnaya Metallurgicheskaya Kompaniya, Moscow (RU)

( * ) Notice: Subject to any disclaimer, the term of this patent is extended or adjusted under 35 U.S.C. 154(b) by 0 days.

(21) Appl. No.: 18/011,651

(22) PCT Filed: Jun. 29, 2020

(86) PCT No.: PCT/RU2020/000315
§ 371 (c)(1),
(2) Date: Dec. 20, 2022

(87) PCT Pub. No.: WO2022/005320
PCT Pub. Date: Jan. 6, 2022

(65) Prior Publication Data
US 2023/0250699 A1 Aug. 10, 2023

(51) Int. Cl.
*E21B 17/02* (2006.01)
*F16L 15/04* (2006.01)
*F16L 15/06* (2006.01)

(52) U.S. Cl.
CPC .............. *E21B 17/02* (2013.01); *F16L 15/04* (2013.01); *F16L 15/06* (2013.01)

(58) Field of Classification Search
CPC ........ E21B 17/02; E21B 17/043; F16L 15/04; F16L 15/06
See application file for complete search history.

(56) References Cited

U.S. PATENT DOCUMENTS

| 5,462,315 A | 10/1995 | Klementich |
| 2015/0191980 A1* | 7/2015 | Rekin ................. F16L 15/06 285/334 |

(Continued)

FOREIGN PATENT DOCUMENTS

| EA | 201401342 | 6/2015 |
| RU | 2639343 | 12/2017 |

(Continued)

*Primary Examiner* — Tara Schimpf
*Assistant Examiner* — Yanick A Akaragwe
(74) *Attorney, Agent, or Firm* — Aleksandr Smushkovich

(57) ABSTRACT

A threaded joint for production of tubing includes a male element and female elements, having outer surface and inner surfaces, respectively, whose ends are configured with a trapezoidal tapered thread and with sealing surfaces, auxiliary surfaces and abutting end surfaces, which form an inner sealing assembly. The threads have characteristics described in the present disclosure. Auxiliary surfaces are provided between the sealing surfaces and the abutting end surfaces. The junction between the sealing surfaces and the auxiliary surfaces is configured in the form of a concave spherical surface on the male element and a convex spherical surface on the female element. This provides for the formation of a tight joint under high mechanical loads by virtue of improved coupling characteristics and the prevention of damage to the surfaces.

9 Claims, 4 Drawing Sheets

(56) References Cited

U.S. PATENT DOCUMENTS

2018/0051835 A1* 2/2018 Lane .................... F16L 58/04
2019/0368639 A1 12/2019 Shcherbakov

FOREIGN PATENT DOCUMENTS

| WO | WO2014092605 | 6/2014 |
| WO | WO2014187873 | 11/2014 |

* cited by examiner

THREADED JOINT FOR PRODUCTION TUBING

CROSS-REFERENCE TO RELATED APPLICATIONS

This application is a U.S. national stage application of an international application PCT/RU2020/000315 filed on 29 Jun. 2020, published as WO/2022/005320.

FIELD OF THE INVENTION

The invention refers to thread connections for tubings and can be applied for joining of the string elements, used for construction and exploitation of vertical, directional and horizontal wells at oil, gas, gas-condensate fields.

BACKGROUND OF THE INVENTION

The tubings used at oil, gas and gas-condensate fields are exploited under complicated conditions—at sufficient mechanical loads. At the same time the main requirements for tubings are preservation of tightness at high multidirectional mechanical loads and wear resistance.

In addition, taking into consideration assembly of thread connections for tubing in the field, the thread connections shall have high characteristics of make-up-speed and easiness of make-up and break-out, reliable alignment, stabilization of elements of the thread connection relative to each other, withstanding of multiple cycles of make-up/break-out without damages observed on contact surfaces of the thread, seal and shoulder end face surfaces.

The prior art discloses the thread connection for tubing (patent RU No 182758, E21B 17/042, F16L15/00, published on Aug. 30, 2018), adopted as a prototype, containing male and female elements, at the ends of which are made, respectively, external and internal threads with a taper of 1:16, pitch 3.175 or 4.233 mm, with a load flank produced at an angle from 1 to 5° to thread axis normal line, and a stab flank produced at an angle from 8 to 12° to thread axis normal line.

The internal sealing unit is formed by sealing surfaces produced at an angle from 55 to 65° to the thread axis normal line, and shoulder end face surfaces produced at an angle from 10 to 20° to the thread axis normal line.

However, the thread connection for tubings does not have the necessary make-up characteristics that allow the thread connection to withstand multiple cycles of make-up/break-out without damages (formation of gallings) observed on contact surfaces of thread, seal and shoulder end face surfaces. Jamming of the connection at the initial stage of make-up, and damage (formation of galling) of the thread surface, thread connection seal and shoulder end face surfaces during operation, under the influence of mechanical loads of high level, lead to loss of tightness of the connection.

BRIEF SUMMARY OF THE INVENTION

The technical result provided by the claimed invention consists in a high degree of tightness of the connection being affected by combined multidirectional mechanical loads due to the improved characteristics of the connection make-up-ensuring at the initial stage of make-up a reliable centering of the female element relative to the male element and preventing the connection from jamming, no damage to the connection surfaces during multiple cycles of make-up/break-out.

The specified technical result is achieved due to the fact that in tubing thread connections containing male and female elements, the ends of which, both externally and internally, are produced correspondingly with tapered trapezoidal threads, and sealing and shoulder end face surfaces which collectively form an internal sealing unit.

The trapezoidal threads of the male and female elements are produced with 1:16 taper, with the slope angle of a turn profile load flank from −1 to +1° to the thread axis normal line and with the slope angle of a turn profile stab flank from 14 to 16° to the thread axis normal line; each of the trapezoidal threads includes a root and a crest; wherein the crests of the turn profile are parallel to the axial line of the thread, and the roots of the turn profile are arranged with a 1:16 taper.

The internal sealing unit is produced by the sealing surfaces produced on the male and female elements with the slope angle ranged from 17 to 19° to the axial line of thread, and the shoulder end face surfaces of the male and female elements are produced at an angle from 14 to 16° to the thread axis normal line.

In addition, the internal sealing unit is equipped with additional surfaces performed between the sealing surfaces and the shoulder end face surfaces on the male and female elements, and the joint of the sealing surfaces with the additional surfaces is produced in the form of concave spherical surface on the male element and in the form of convex spherical surface on the female element.

In the particular case of design of the claimed invention, the trapezoidal tapered threads of male and female elements are produced with the pitch of 3.175 mm.

In the particular case of design of the claimed invention, the trapezoidal tapered threads of male and female elements are produced with the pitch of 4,233 mm.

In the particular case of design of the claimed invention, the load flank of the thread turn profile of the male element is equipped with the additional segment adjacent to the root and produced at an angle from 4 to 6° to the thread axis normal line.

In the particular case of design of the claimed invention, the concave spherical surface between the sealing surface and the additional surface of the male element is produced with the radius from 7 to 9 mm.

In the particular case of design of the claimed invention, the convex spherical surface between the sealing surface and the additional surface of the female element is produced with the radius from 4 to 6 mm.

In the particular case of design of the claimed invention, the additional surfaces on the male and female elements are cylindrical.

In the particular case of design of the claimed invention, the additional surfaces on the male and female elements are produced with 1:10 taper.

In the particular case of design of the claimed invention, the additional surface on the male element is produced with 1:10 taper, and the additional surface on female element is cylindrical.

BRIEF DESCRIPTION OF DRAWINGS

The Invention is Illustrated by the Following Drawings.

DETAILED DESCRIPTION OF THE INVENTION

The thread connection for tubing contains male (1) and female (2) elements the ends of which, both externally and internally, are produced correspondingly with tapered trapezoidal threads. The inventive thread connection is characterized with a thread axis line.

Figure 1:
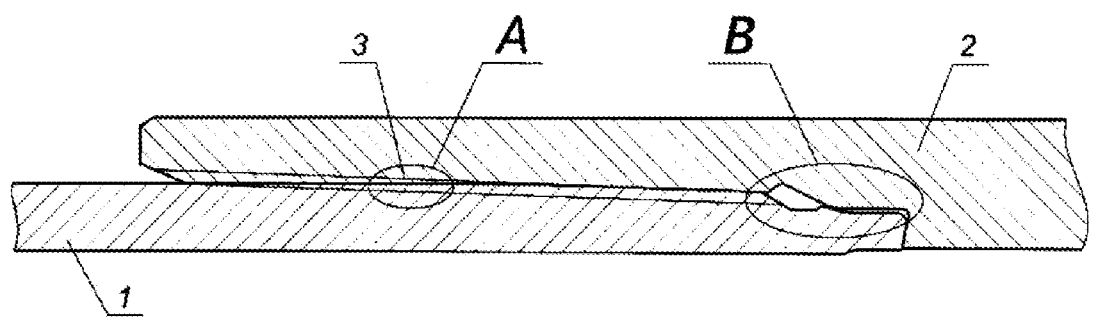
FIG. 1 shows the inventive thread connection for tubings made-up.
Figure 2:
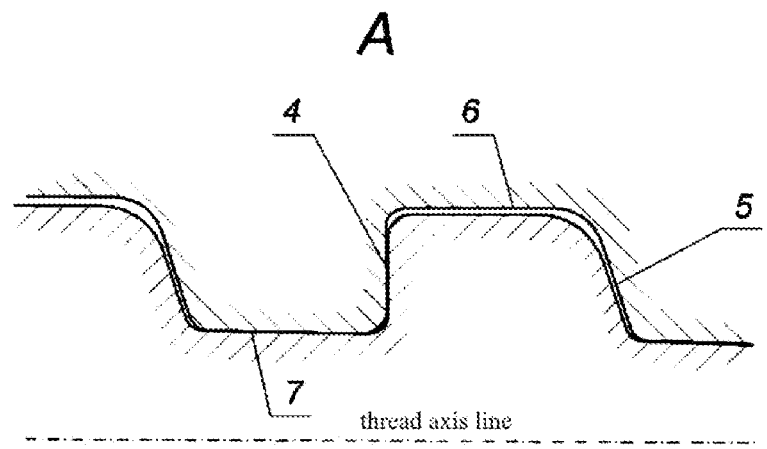
FIG. 2 shows view A to FIG. 1—thread connection turn profile.

The inventive thread connection (as shown on FIG. 1) comprises a male element (1) and a female element (2) of the thread profile (3). The external surface of the male element (1) and the internal surface of the female element (2) are made with a 1:16 taper. The taper of 1:16 provides an optimal combination of a high level of tooth action of the threads of the male (1) and female (2) elements when making-up, as well as the possibility to undertake high bending and tensile loads, affecting during operation of the connection and to preserve high characteristics of make-up of the connection, and prevention of the thread from jamming.

According to the invention, the thread connection is characterized with a thread turn profile (3) made in a form of unequal-sided trapezium, the sides of which are made in the form of a load flank (4) and a stab flank (5), having different slope angles to a thread axis normal line.

The thread turn profile (3) of the male (1) and female (2) elements is produced with the slope angle of the load flank (4) in the range from −1 to +1° to the thread axis normal line and with the slope angle of the stab flank (5) from 14 to 16° to the thread axis normal line.

The thread axis normal line is understood to be the perpendicular to the thread axis line. The slope angle of the load flank (4) of the thread (3) turn profile is produced from −1 to +1° to the thread axis normal line that eliminates the possibility for the turns of the male (1) and female elements (2) of running out from the tooth action at significant tensile and bending loads (loss of tightness) applied to the thread connection, for example, under the action of the own weight of the string running into the well.

Figure 4:
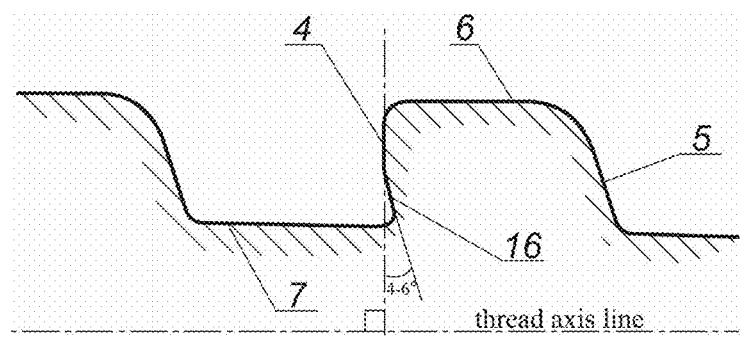
FIG. 4 shows a fragment of an embodiment of the invention including an additional section adjacent to the root of the threads turn profile.

In the particular case of design of the claimed invention, the load flank (4) of the thread turn profile (3) of the male element (1) is furnished with an additional section (16) adjacent to a root (7) (as shown on FIG. 4) and produced at an angle in the range from 4 to 6° to the thread axis normal line, which eliminates the immediate contact of the load flanks (4) of the male (1) and female (2) elements in the area adjacent to the root (7), which prevents damage to surfaces of the load flanks (4) in this area (gallings). This is also an additional factor, providing the possibility of multiple cycles of make-up/break-out of the connection without damages to the surfaces.

The height of the specified additional section of the load flank (4) of the thread turn profile (3) of the male element (1) can reach from 30 to 40% of the height of thread turn profile (3).

The slope angle of the stab flank (5) of the thread turn profile (3) to the thread axis normal line is produced in the range from 14 to 16°, that stabilizes the position of the male element (1) relative to the female element (2) at the initial stage the connection make-up, which prevents from jamming of the connection, damage to the surfaces of the thread turns (3), the formation of gallings and provides the possibility of multiple cycles of make-up/break-out of the connection without loss of tightness characteristics.

In addition a structural gap appears on stab flanks (5) of the threads turn profile (3) of the connection in the made-up state, that provides possibility of multiple make-up/break-out without damages (galling) on the stab flanks (5) of threads turn profile (3).

Crests (6) of thread turn profile (3) are produced parallel to the axial line of thread, that excludes jamming of the thread at the initial stage of make-up, provides a deep free entry of the male element (1) into the female element (2) during make-up, without damages (galling) of the crests (6) of the thread turn profile (3).

In addition, the roots (7) of the threads turn profile (3) are produced with a taper of 1:16 identical to the taper of the threads turn profile (3), that reduces the loss of wall thickness of the male element (1) when the thread (3) is produced on it and provides a general increase in the strength of the male element (1).

The inventive thread connection is produced with the internal sealing unit, which is collectively formed by contacting sealing surfaces (8), (9) and shoulder end face surfaces (10), (11) on the male (1) and female (2) elements of the thread connection.

The sealing surfaces (8), (9) of the thread connection in the made-up (assembled) state contact each other with sufficient contact stresses, with the appearance of deformation in the elastic strain range and formation of a "metal-to-metal" sealing, provide high tightness of the connection including gas tightness of the connection being affected by multidirectional mechanical combined loads in any combinations.

The sealing surfaces (8), (9) are produced with the slope angle ranged from 17 to 19° to the thread axial line. The specified slope angle of the sealing surfaces (8), (9) provides an optimal contact area and a high stress level of the contacting sealing surfaces (8), (9), which ensures tightness of the connection at all load combinations over the entire range of tolerance fields.

The contact of the sealing surfaces (8), (9) located at the specified slope angle occurs with an interference over a relatively small area, while significant contact stresses occur, providing the high tightness. In addition, the sealing surfaces (8), (9) are not damaged during the repeated make-up due to the rapid achievement of the radial interference value.

Figure 3:
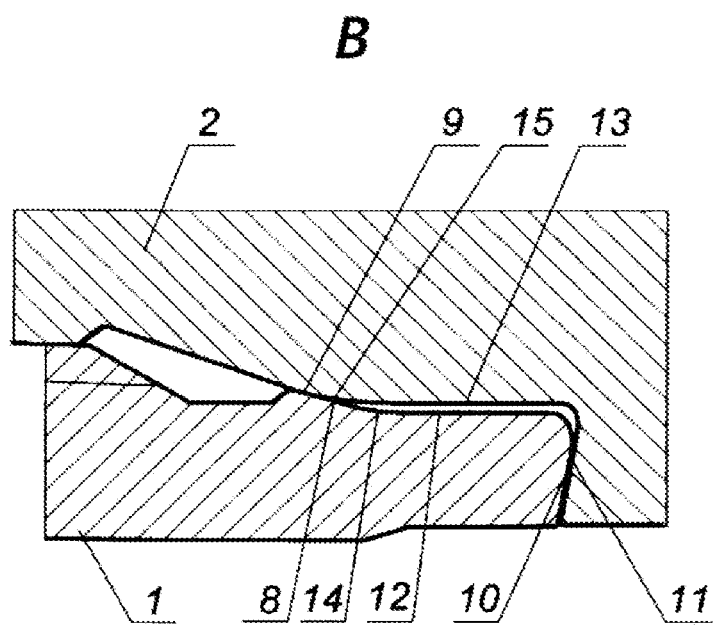
FIG. 3 shows view B to FIG. 1—an internal sealing unit.

As shown on FIG. 3, there are provided shoulder end face surfaces (10), (11) of the male (1) and female (2) elements arranged at an angle from 14 to 16° to the thread axis normal line that provides "contraction" and fixing of the sealing surfaces (8), (9) of the thread connection, creates its resistance to compression loads, and provides an additional sealing barrier. Besides that, the accurate positioning of the male (1) element relative to the female (2) element, the accurate fixing of the design value of interference and make-up torque during make-up of the connection are provided—that is, improved make-up characteristics, possibility of inspection of the connection make-up are provided. The increased contact area of the shoulder end face surfaces (10), (11) with each other due to the slope angle (from 14 to 16°) makes it possible to increase the make-up torque while maintaining the contact stresses at the necessary level within the elastic strains range, that is, to ensure the absence of damage (gallings) of the shoulder end face surfaces (10), (11).

Figure 3A:
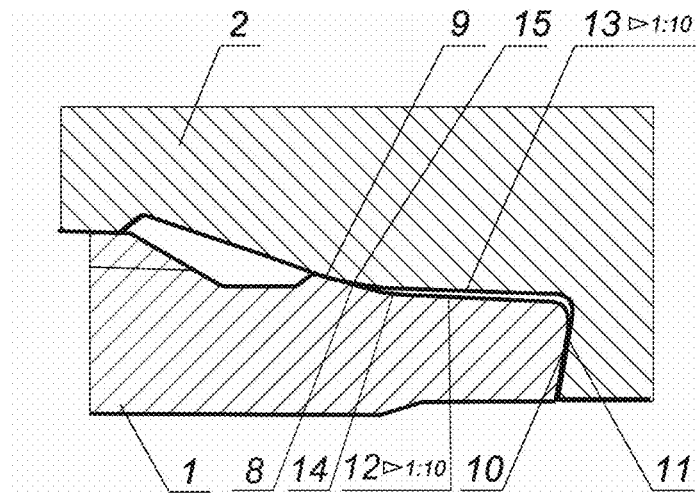
FIG. 3a shows view B to FIG. 1 for an embodiment with additional surfaces having a taper of 1:10 on the male and female elements.
Figure 3B:
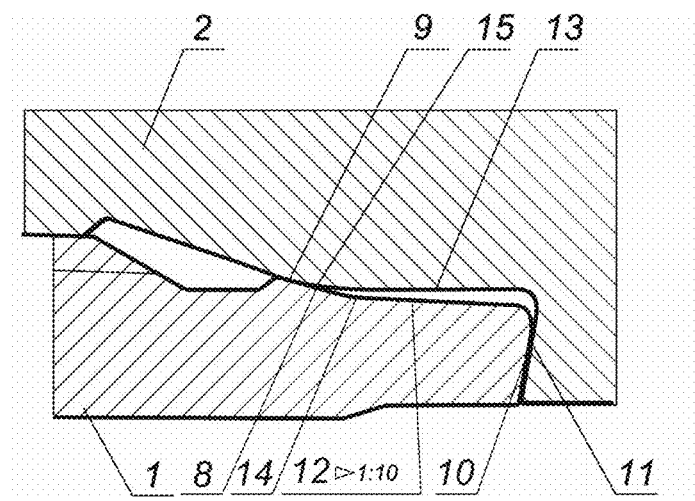
FIG. 3b shows view B to FIG. 1 for an embodiment with an additional surface having a taper of 1:10 on the male element and a cylindrical additional surface on the female element.

Between the sealing surfaces (8), (9) and the shoulder end face surfaces (10), (11) on the male and female elements, additional surfaces (12), (13) being not in contact with each other are provided, forming a gap therebetween. The additional surfaces (12), (13) can be produced both cylindrical and tapered with a taper of, for example, 1:10 (FIGS. 3a and 3b).

The implementation of the sealing surfaces (8), (9) at the distance from the shoulder end face surfaces (10), (11), that is, the removal of the contact area of sealing surfaces (8), (9) from the contact area of shoulder end face surfaces (10), (11), provides a decrease in the dependence on each other of the work of the sealing surfaces and the shoulder end face surfaces on the seal and, accordingly, ensures the maximum tightness of the connection at any combination of loads, including gas tightness.

The joint of the sealing surfaces (8), (9) with the additional surfaces (12), (13) are produced in the form of a concave spherical surface (14) on the male (1) element and in the form of a convex spherical surface (15) on the female (2) element (FIG. 3).

During the make-up process of the thread connection, after interaction of the threads (3) of the male (1) and female (2) elements, the sealing surfaces (8), (9) of the male (1) and female (2) elements move relative to each other, which begins from the interaction of the concave spherical surface (14) on the male (1) element and the convex spherical surface (15) on the female (2) element, that facilitates the passage of the sealing surfaces (8), (9) relative to each other in the first moments of contact, ensures the safety of the sealing surfaces (8), (9), their protection from damages (galling) during make-up of the connection.

In addition, the convex spherical surface (15) on the female (2) element increases the contact area of the sealing surfaces (8), (9) of the male (1) and the female (2) elements, which positively affects the tightness of the connection.

The Implementation of the Invention

The claimed thread connection for tubing works as follows. When making up the connection, after centering the male (1) and female (2) elements relative to each other, the male (1) and female (2) elements interact initially due to tapered trapezoidal threads (3) produced on the external surface of the male (1) element and internal surface of the female (2) element.

Thereafter spherical surfaces (14), (15) and sealing surfaces (8), (9) of the male (1) and the female (2) elements interact, due to the plastic strain of which a "metal-to-metal" sealing is created.

The connection make-up process completion is conducted with the power contact of the shoulder end face surfaces (10), (11), produced on the male (1) and female (2) elements, as a result of which the contact stresses also arise on the shoulder end face surfaces (12), (13), the value of which is within elastic strains range.

Example of Implementation of the Invention

To carry out testings of the claimed thread connection for tubings two specimens were manufactured. For specimen No. 1 the tubing with the nominal diameter of 73 mm was used as a stock. On outside surface of the male element and inside surface of the female element of this specimen the trapezoidal tapered threads are produced with 1:16 taper, with the pitch of 3.175 mm, with the slope angle of turn profile stub flank 14° and the slope angle of turn profile load flank −1° to thread axis normal line. The crests of the turn profile are parallel to the thread axial line, and the roots of the turn profile are produced with a taper of 1:16.

The internal sealing unit elements are formed: the sealing surfaces of the male and female elements are produced with the slope angle of 17° to the thread axial line, the additional surfaces are cylindrical, the concave spherical surface connecting the sealing and additional surfaces of the male element is produced with a radius of 7 mm, and the convex spherical surface connecting the sealing and additional surfaces of the female element is produced with a radius of 4 mm.

For specimen No. 2 the tubing with the nominal diameter of 114 mm was used as a stock. On outside surface of the male element and inside surface of the female element of this specimen the trapezoidal tapered threads are produced with 1:16 taper, with the pitch of 4.233 mm, with the slope angle of turn profile stub flank 16° and the slope angle of turn profile load flank 1° to thread axis normal line. The crests of the turn profile are parallel to the axial line of the thread, and the roots of the turn profile are produced with a taper of 1:16.

The internal sealing unit elements are formed: the sealing surfaces of the male and female elements are produced with the slope angle of 19° to the thread axial line, the additional surfaces are produced with a taper of 1:10, the concave spherical surface connecting the sealing and additional surfaces of the male element is produced with a radius of 9 mm, and the convex spherical surface connecting the sealing and additional surfaces of the female element is produced with a radius of 6 mm.

Besides, the specimen No. 3 was manufactured, having geometric parameters of the prototype—as a stock for which a tubing with a nominal diameter of 114 mm was used. On outside surface of the male element and inside surface of the female element of the specimen No. 3 the trapezoidal tapered threads are produced with 1:16 taper, with the pitch of 3.175 mm, the slope angle of the turn profile stub flank 10° and the slope angle of turn profile load flank 3° to thread axis normal line.

Internal sealing unit elements are formed: the sealing surfaces are produced at an angle of 30° to thread axial line; the shoulder end face surfaces are produced at an angle of 15° to thread axis normal line.

The specimens were tested for the number of make-up/break-out withstanding by the threaded connection until the appearance of damage of the surfaces of the thread and of the internal sealing unit.

The testings of the specimens showed the appearance of surface damages (gallings) after five cycles of make-up/break-out of specimen No. 3 made according to the prototype, and the absence of jamming of the connection and damages (gallings) on the surface after nine cycles of make-up/break-out of specimens No No 1, 2 made in accordance with the claimed invention.

When using the proposed thread connection for tubing, the tightness of the connection is preserved while the value of combined multidirectional mechanical loads increases by 20%.

The invention claimed is:

1. A thread connection for tubing; said thread connection comprises:
    male and female elements, at the ends of which on the outer and inner surfaces, respectively, trapezoidal threads with a taper of 1:16 are provided; said trapezoidal threads each includes a turn profile root with a taper of 1:16 and a turn profile crest parallel to a thread axial line;
    sealing surfaces and shoulder end face surfaces collectively forming an internal sealing unit, wherein an angle in the range from 14 to 16° is provided between the shoulder end face surfaces and a thread axis normal line;
wherein:
    the trapezoidal threads of the male and female elements are arranged with a slope angle of a load flank of the turn profile in the range from −1 to +1° to the thread axis normal line, and a slope angle of a stab flank of the turn profile is arranged in the range from 14 to 16° to the thread axis normal line;
    the internal sealing unit is formed by:
        the sealing surfaces arranged on the male and female elements with the slope angle in the range from 17 to 19° to the thread axial line, and the shoulder end face surfaces of the male and female elements; and
    the internal sealing unit is provided with:
        additional surfaces arranged between the sealing surfaces and the shoulder end face surfaces on the male and female elements, and a joint of the sealing surfaces with the additional surfaces is provided in the form of a concave spherical surface on the male element and a convex spherical surface on the female element.

2. The connection according to claim 1, wherein the trapezoidal threads of the male and female elements are provided with a pitch of 3.175 mm.

3. The connection according to claim 1, wherein the trapezoidal tapered threads of the male and female elements are provided with a pitch of 4.233 mm.

4. The connection according to claim 1, wherein
    said thread turn profile is characterized with a thread height; and
    the load flank of the thread turn profile of the male element is provided with an additional section adjacent to the root and arranged at an angle in the range from 4 to 6° to the thread axis normal line, wherein the height of the additional concave section of the load flank of the male element has a range from 30 to 40% of the thread height.

5. The connection according to claim 1, wherein the concave spherical surface connecting the sealing and the additional surfaces of the male element is arranged with a radius ranged from 4 to 6 mm.

6. The connection according to claim 1, wherein the convex spherical surface connecting the sealing and the additional surfaces of the female element is arranged with a radius ranged from 4 to 6 mm.

7. The connection according to claim 1, wherein the additional surfaces on the male and female elements are cylindrical.

8. The connection according to claim 1, wherein the additional surfaces on the male and female elements are provided with equal tapers of 1:10.

9. The connection according to claim 1, wherein the additional surface on the male element is provided with a taper of 1:10, and the additional surface on the female element is cylindrical.

* * * * *